US011977809B2

(12) United States Patent
Choi et al.

(10) Patent No.: US 11,977,809 B2
(45) Date of Patent: May 7, 2024

(54) CONSOLE DISPLAY INTERLOCKING METHOD AND VEHICLE SYSTEM USING THE SAME

(71) Applicant: HYUNDAI MOBIS CO., LTD., Seoul (KR)

(72) Inventors: Myung Bin Choi, Seoul (KR); Sung Joon Ahn, Seongnam-si (KR); Tae Hun Kim, Seongnam-si (KR); Kyung Hoon Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 18/068,078

(22) Filed: Dec. 19, 2022

(65) Prior Publication Data

US 2023/0221913 A1  Jul. 13, 2023

(30) Foreign Application Priority Data

Jan. 11, 2022 (KR) .......................... 10-2022-0003951
Jan. 11, 2022 (KR) .......................... 10-2022-0003952

(51) Int. Cl.
*G06F 3/14* (2006.01)
*B60K 35/00* (2006.01)

(52) U.S. Cl.
CPC ............ *G06F 3/1454* (2013.01); *B60K 35/00* (2013.01); *B60K 2370/152* (2019.05); *B60K 2370/77* (2019.05)

(58) Field of Classification Search
CPC ....................................................... B60K 35/00
See application file for complete search history.

(56) References Cited

U.S. PATENT DOCUMENTS

| 10,235,122 | B1* | 3/2019 | Goel ...................... G06F 3/1423 |
| 2018/0147988 | A1* | 5/2018 | Lee ...................... G01C 21/3697 |
| 2018/0281689 | A1* | 10/2018 | Cha ........................ G06F 1/1656 |
| 2019/0212732 | A1* | 7/2019 | Takanashi ............ G05D 1/0027 |

\* cited by examiner

*Primary Examiner* — Nan-Ying Yang
(74) *Attorney, Agent, or Firm* — NovoTechIP International PLLC

(57) ABSTRACT

A method for controlling a vehicle interacting with a console display includes determining a position of the console display; determining an interaction state of the console display; and controlling an output state to be displayed on the console display based on the position information of the console display and an interaction state of the console display.

20 Claims, 15 Drawing Sheets

CONSOLE DISPLAY INTERLOCKING METHOD AND VEHICLE SYSTEM USING THE SAME

CROSS-REFERENCE TO RELATED APPLICATIONS

This application claims the benefit of priority under 35 U.S.C. § 119(a) of Korean Patent Application Nos. 10-2022-0003951 and 10-2022-0003952, both filed on Jan. 11, 2022, the disclosures of which are incorporated herein by reference.

BACKGROUND OF THE DISCLOSURE

Field of the Disclosure

The embodiments of the present disclosure are applicable to vehicles of all fields, and more particularly to, for example, a vehicle that supports autonomous driving.

Discussion of the Related Art

Research has been conducted on autonomous driving that enables a vehicle to move without intervention of a user. Autonomous driving devices are largely classified into five generations. Recently, third-generation autonomous driving devices that can change lanes with partially autonomous driving, fourth-generation autonomous driving devices that can perform autonomous driving to a destination by properly coping with external risks caused by the driving environment through semi-autonomous driving, and fifth-generation autonomous driving devices that can perform autonomous driving without user intervention on all routes through fully autonomous driving have been intensively researched and discussed.

SUMMARY OF THE DISCLOSURE

Accordingly, embodiments of the present disclosure are directed to a console display interlocking control method and a vehicle system using the same that substantially obviate one or more problems due to limitations and disadvantages of the related art.

To solve the above-described problems, as a display applied to a vehicle increases in size according to the advancement and popularization of autonomous driving technology, there is needed a remote-controller that can be easily used even at a remote site located outside the existing touchable region of the display.

In addition, the environment required for the user, such as a package change suitable for mode switching of the vehicle, a screen user interface (UI) change, etc. needs to be provided by the vehicle.

In addition, convenient usability needs to be provided by the vehicle so that mode switching of the vehicle can be immediately performed whenever a user request occurs.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a method for controlling a vehicle interacting with a console display includes determining a position of the console display; determining an interaction state of the console display; and controlling an output state to be displayed on the console display based on the position information of the console display and an interaction state of the console display.

The determining the position of the console display may include determining whether the console display is located inside or outside the vehicle.

The controlling the output state may include when the console display is located outside the vehicle, outputting an external operating system by the console display.

The determining the position of the console display may include when the console display is located inside the vehicle, determining whether the console display is located at a front seat of the vehicle.

The determining the output state may include, when the console display is located at a back seat of the vehicle, outputting a back-seat operating system by the console display.

The determining the interaction state of the console display may include, when the console display is located at a front seat of the vehicle, determining whether the console display interacts with a steering wheel or a front display of the vehicle.

The controlling the output state may include, when the console display interacts with the steering wheel, outputting a steering wheel operating system by the console display.

The outputting the steering wheel operating system may include outputting a first steering-wheel operating system that is output when the control display is located behind the steering wheel; and outputting a second steering-wheel operating system that is output when the console display is located in front of the steering wheel.

The controlling the output state may include, when the console display interacts with the front display, outputting a front display operating system by the console display.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION OF THE DISCLOSURE

Figure 1:
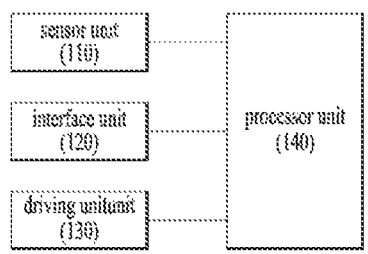
FIG. 1 is a block diagram illustrating a vehicle system according to embodiments of the present disclosure.

Hereinafter, embodiments of the present disclosure will be described in detail with reference to the accompanying drawings so that the present disclosure may be easily realized by those skilled in the art. However, the present disclosure may be achieved in various different forms and is not limited to the embodiments described herein. In the drawings, parts that are not related to a description of the present disclosure are omitted to clearly explain the present disclosure and similar reference numbers will be used throughout this specification to refer to similar parts.

In the specification, when a part "includes" an element, it means that the part may further include another element rather than excluding another element unless otherwise mentioned.

In addition, the term "mobile device" to be used in the following description assumes a vehicle used to transport passengers, but is not limited thereto, and it should be noted that the vehicle acting as the mobile device may also include an Urban Air Mobility (UAM) aircraft, a bus, and the like.

FIG. 1 is a block diagram illustrating a vehicle system according to embodiments of the present disclosure.

In one embodiment of the present disclosure, the vehicle may include a sensor unit 110, an interface unit 120, a driving unit 130, and a processor unit 140.

The sensor unit 110 may include at least one sensor capable of recognizing internal and/or external states of the vehicle. The sensor unit 110 may include, for example, a camera sensor, an infrared (IR) sensor, a radar sensor, a voice sensor, a temperature sensor, a humidity sensor, and the like. The interface unit 120 may include at least one interface that provides a user of the vehicle with various audiovisual data or information related to or not related to the vehicle and/or provides the user of the vehicle with a control tool for the vehicle or a control tool for component(s) of the vehicle. The interface unit 120 may include, for example, display(s) provided to passenger(s), and/or audio device(s) provided to the passenger(s), and the like. The interface unit 120 may exchange signals with at least one electronic device embedded in the vehicle by wire or wirelessly. The interface unit 120 may convert an input signal entered by the user of the vehicle into an electrical signal, and may provide the electrical signal to the processor unit 140.

The driving unit 130 may physically drive and/or drive internal or external components of the vehicle based on the control of the processor unit 140. For example, the driving unit 130 may change physical position(s) of the wheel(s), the steering wheel, the seat(s), and the display(s) of the vehicle.

The processor unit 140 may include at least one processor. The at least one processor in the processor unit 140 may be electrically connected to components (for example, the sensor unit, the interface unit, and the communication unit (not shown)) of the vehicle, may exchange signals with the components of the vehicle, and may control the components of the vehicle. The processor unit 140 may further include at least one memory (not shown). The one or more processors may be referred to as controllers, microcontrollers, microprocessors, or microcomputers. The one or more processors may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors, or may be stored in the one or more memories and executed by the one or more processors. The descriptions, functions, procedures, proposals, methods, and/or operational flowcharts disclosed in this document may be implemented as code, instructions, and/or a set of instructions in firmware or software.

The processor unit 140 may generate control signals for the sensor unit 110, the interface unit 120, and/or the driving unit 130 based on the electrical signals received from the sensor unit 110 and/or the interface unit 120.

The at least one memory may be connected to at least one processor and may store various information related to operations of the at least one processor. For example, the at least one memory may store software code including instructions for performing some or all of the processes controlled by the at least one processor, or for performing the procedures and/or methods described/suggested below. The at least one memory may store commands, instructions, or programs that, when executed, cause at least one processor operably connected to the at least one memory to perform operations according to embodiments of the present disclosure.

The vehicle may further include a communication unit. The communication unit may include one or more transceivers. The at least one transceiver may receive, from one or more other devices, user data, control information, and/or radio signals/channels, mentioned in the functions, procedures, methods and/or operational flowcharts of this document. For example, the one or more transceivers may be connected to the one or more processors 140 and transmit and receive radio signals. For example, the one or more processors 140 may perform control so that the one or more transceivers may transmit user data, control information, or radio signals to one or more other devices. In addition, the one or more processors 140 may perform control so that the one or more transceivers may receive user data, control information, or radio signals from one or more other devices. In addition, the one or more transceivers may be connected to one or more antennas, and the one or more transceivers may be configured to transmit and/or receive user data, control information, radio signals/channels, etc. to/from other device(s) via one or more antennas.

Figure 2:
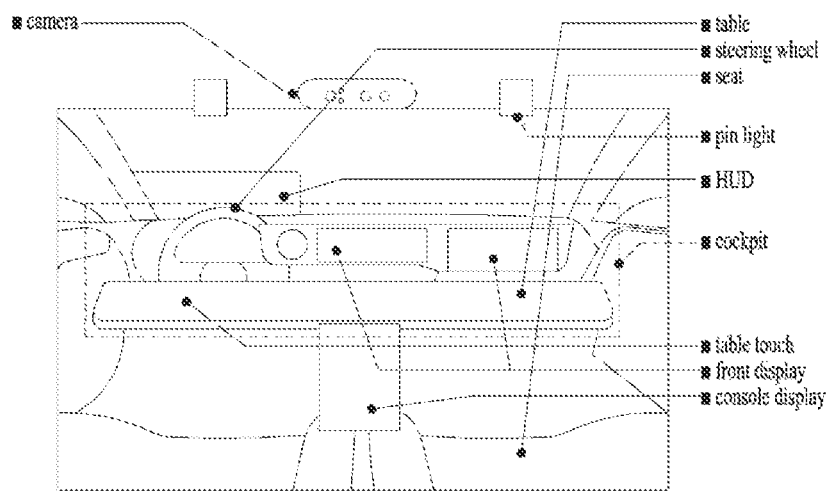
FIG. 2 is a diagram illustrating an internal configuration of a vehicle according to embodiments of the present disclosure.

FIG. 2 is a diagram illustrating an internal configuration of a vehicle according to embodiments of the present disclosure. Referring to FIG. 2, the vehicle may include at least one camera capable of detecting an in-vehicle state, a head-up display (HUD), and a front display(s) providing audiovisual information to occupants (or passengers), and a console display that provides status information of the vehicle to an occupant and/or controls gears, air-conditioning, and/or seat(s) of the vehicle. The vehicle may also include a steering wheel, seat(s) and light (s). In addition, the vehicle may include a table used in an office mode according to embodiments of the present disclosure. The table may include one or more touch buttons. A cockpit of the vehicle according to the embodiments of the present disclosure may include a steering wheel, front display(s), and a table. The cockpit may also be referred to as an instrument panel (IP) or a dashboard. In accordance with the embodiments of the present disclosure, the cockpit may include an interior space that is located in front of the driver seat and accommodates the steering wheel, and another interior space in which the table can be accommodated. In accordance with the embodiments of the present disclosure, the cockpit may be configured to move the steering wheel and the table according to the riding (or boarding) mode. In accordance with the embodiments of the present disclosure, the console display may be disposed at one side of the driver seat. Alternatively, if there is a (front) passenger seat in the vehicle, the console display may be disposed in a space between the driver seat and the passenger seat.

FIGS. 3 to 6 are diagrams illustrating devices for interacting with a console display embedded in a vehicle and internal components of the console display that is output in correspondence to the corresponding devices according to the embodiments of the present disclosure.

The vehicle system may interact with a front display, a steering wheel, and a console display.

The vehicle system according to the present embodiment may interact with the console display installed in the vehicle such that the passenger (or occupant) can easily use the front display embedded in the vehicle through the console display disposed in the vehicle irrespective of the size and position of the front display even in a situation where it is difficult for the passenger (or occupant) to easily use the front display.

When the console display is located in any of the front seats of the vehicle, the console display can interact with the front display or the steering wheel. Alternatively, when the console display is located in any of the back seats of the vehicle, the console display can interact with the front display. In the console display, a user interface (UI) to be differently displayed on a screen according to the in-vehicle position of the console display and the interaction state of the console display can be changed to another UI.

Figure 3:
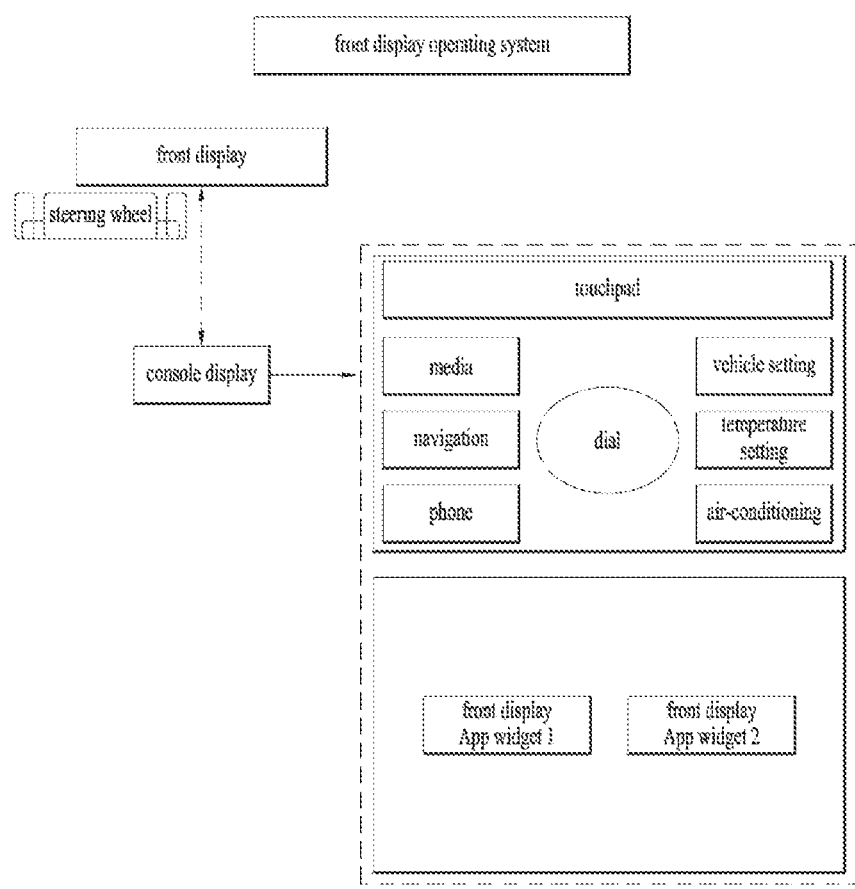
FIGS. 3 to 6 are diagrams illustrating devices for interacting with a console display embedded in a vehicle and internal components of the console display that is output in correspondence to the corresponding devices according to the embodiments of the present disclosure.

FIG. 3 is a view illustrating a screen image of the console display when the console display is located at the front seat of the vehicle and interacts with the front display of the vehicle according to the embodiments of the present disclosure.

Referring to FIG. 3, when the console display is located at the front seat and interacts with the front display, the console display may display a front display operating system. In addition, the front display operating system may include at least one of media, a navigation system, a phone, a vehicle setting function, a temperature setting function, an air-conditioning function, a touchpad, and a dial.

The console display may include a first region in which the front display operating system is displayed, and a second region in which widgets are displayed by linking with an application being executed on the front display. Although information displayed on the console display shown in FIG. 3 is divided into and displayed on two regions for convenience of description, the information displayed on the console display can also be divided into and displayed on a plurality of regions to provide the user with a wider variety of information.

Preferably, the touchpad and dial of the front display operating system displayed on the console display may provide the user interface (UI) to be displayed on the center of the first region, but is not limited thereto. According to the embodiment, the first region of the front display operating system may display a touchpad and a dial for enabling the user to interact with the front display, and may also display application (app) buttons for enabling the user to use various functions.

According to an embodiment of the present disclosure, when the second region of the front display operating system displays two applications (e.g., navigation and media) through the front display, the console display displays two widgets, each of which is a simplified version of the application (app), so that the user can easily manipulate the applications of a large display. When three applications are displayed on the large display, it is preferable that the widgets be displayed to correspond to the respective applications of the large display in a manner that three widgets can be displayed even on a small display, but is not limited thereto.

Figure 4:
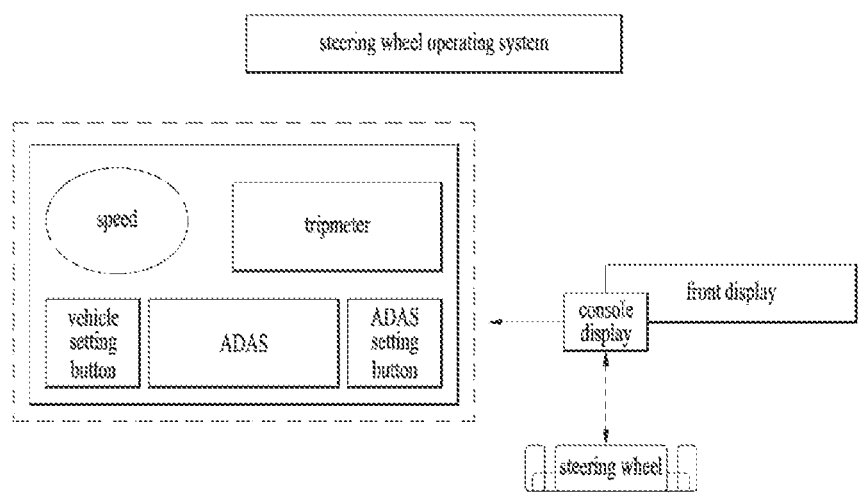
Figure 5:
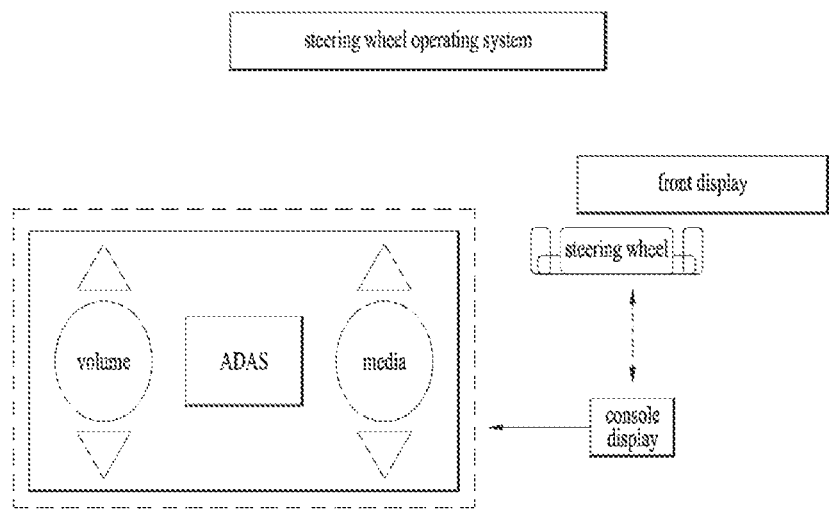

FIGS. 4 to 5 are views illustrating examples of a screen image of the console display when the console display is located at the front seat of the vehicle and interacts with the steering wheel according to an embodiment of the present disclosure.

When the console display approaches the steering wheel within a preset distance, the console display can interact with the steering wheel. According to one embodiment of the present disclosure, when the console display approaches the steering wheel within 10 cm or less, the console display can automatically interact with the steering wheel.

The console display may be displayed as a steering wheel operating system. As shown in FIGS. 4 and 5, the steering wheel operating system displayed on the console display may include at least one of a speed, a tripmeter, a vehicle setting button, an ADAS, and an ADAS setting button.

In addition, the steering wheel operating system may include at least one of a volume function, a media function, and an ADAS function. Preferably, the ADAS may provide the UI to be displayed at the center of the second region, but is not limited thereto.

Referring to FIG. 4, when the console display is located at the rear of the steering wheel, a first steering wheel operating system capable of displaying a cluster, a tripmeter, and ADAS functions may be displayed. The first steering wheel operating system may display ADAS operation buttons (e.g., adjustment of an interval between a host vehicle and a preceding vehicle, speed setting, etc.) and vehicle setting (e.g., lamp operation, wiper operation, etc.) buttons.

Referring to FIG. 5, when the console display is located in front of the steering wheel (i.e., the driver's side), a second steering wheel operating system capable of manipulating media, volume, and ADAS functions may be displayed on the console display.

Figure 6:
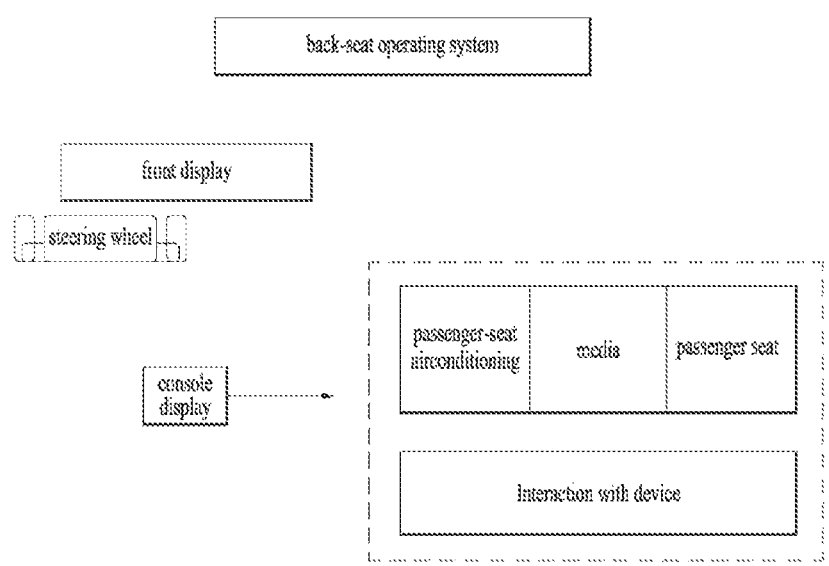

FIG. 6 is a view illustrating a screen image of the console display when the console display is located at the back seat of the vehicle according to an embodiment of the present disclosure.

When the console display is located at the back seat of the vehicle, the console display may display a back-seat operating system. In this case, the back-seat operating system may include at least one of media, navigation, phone, vehicle setting, temperature setting, air-conditioning function, touchpad, and dial.

The console display may include a first region in which the front display operating system is displayed, and a second region in which a widget is displayed by linking with the application being executed on the front display.

Although information displayed on the console display shown in FIG. 6 is divided into and displayed in two regions for convenience of description, the information displayed on the console display can also be divided into and displayed in a plurality of regions to provide the user with a wider variety of information.

The console display may also be used as a standalone device while operating as the back-seat operating system.

According to an embodiment, the back-seat operating system may include at least one of a media function, a passenger-seat air-conditioning function, and a passenger seat function. That is, the console display may also provide the back-seat operating system and the air-conditioning operating system.

When the console display is used as a standalone device, the console display may display a large screen by interacting with a personal device of the user and may provide the UI corresponding to web search or media playback, but is not limited thereto.

Figure 7:
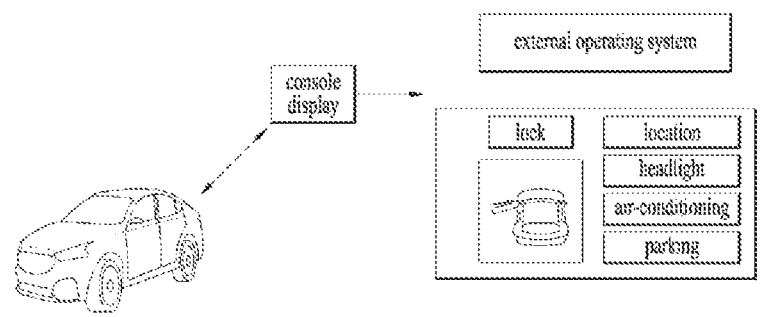
FIG. 7 is a diagram illustrating a screen image of a console display when the console display is located outside the vehicle and interacts with a front display according to an embodiment of the present disclosure.

FIG. 7 is a view illustrating a screen image of the console display when the console display is located outside the vehicle and interacts with the front display according to an embodiment of the present disclosure.

When the console display is located outside the vehicle, the console display may display an external operating system that can allow the user who is located outside the vehicle to use various functions of the vehicle. For example, the console display can operate as a smart key that can enable the user located outside the vehicle to manipulate various functions of the vehicle.

In this case, the external operating system may display one or more functions of the vehicle, for example, a window/door locking function, a headlight ON/OFF function, a fuel gauge function, a location (e.g., GPS) transmission function, an air-conditioning function, a parking function, and the like.

In addition, the console display may display a monitoring function for displaying the surrounding situation with a camera. The control display may display at least one monitoring piece of information selected by the user from among various kinds of control information related to screen images displayed on the console display.

Figure 8:
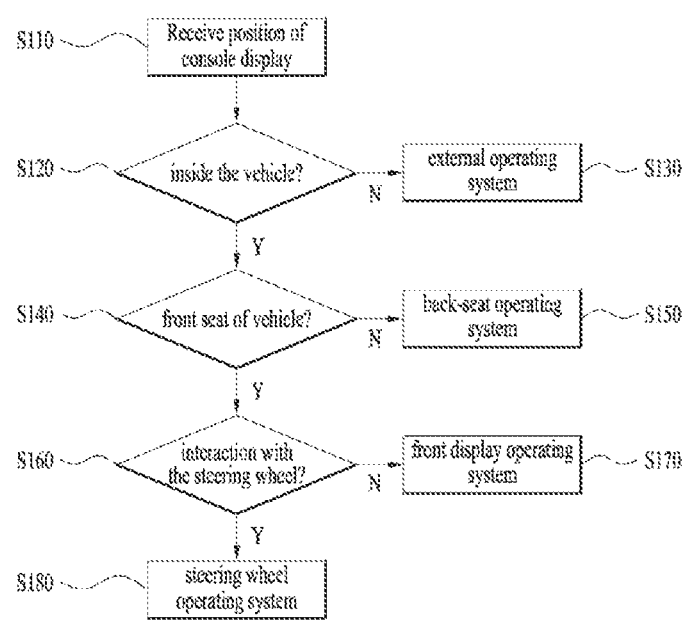
FIG. 8 is a flowchart illustrating a control method for interacting with the console display according to an embodiment of the present disclosure.

FIG. 8 is a flowchart illustrating a control method for interacting with the console display according to an embodiment of the present disclosure.

Referring to FIG. 8, the method for controlling the vehicle interacting with the console display may include determining the position of the console display upon receiving the position of the console display, determining interaction states of the console display, and controlling an output image displayed on the console display based on the location information of the console display and the determined interaction states of the console display. In this case, the location information of the console display may be classified into information about the front seat of the vehicle and information about the back seat of the vehicle.

The vehicle may receive the location of the console display (S110), and may determine whether the console display is located inside the vehicle (S120).

After step S120, when the console display is not located inside the vehicle, the vehicle may determine that the console display is located outside the vehicle. When the console display is located outside the console display, the console display can operate as the external operating system (S130).

After step S130, it can be determined whether the console display is located inside the vehicle. When the console display is located inside the vehicle, it can be determined whether the console display is located at the front seat of the vehicle (S140).

After step S140, when the console display is not located at the front seat of the vehicle, it can be determined that the console display is located at the back seat of the vehicle. When the console display is located at the back seat of the vehicle, the console display can operate as the back-seat operating system (S150).

After step S140, when the console display is located at the front seat of the vehicle, it can be determined whether the console display interacts with the steering wheel (S160).

After step S160, when the console display does not interact with the steering wheel, this means that the console display interacts with the front display. When the console display interacts with the front display, the console display may operate as the front display operating system (S170).

After step S160, when the console display interacts with the steering wheel, the console display can operate as the steering wheel operating system (S180).

FIGS. 9 to 12 are examples of modes in which the console display is provided by a passenger in response to a driving state of the vehicle and display screens of the console display for the corresponding modes according to an embodiment of the present disclosure.

Figure 9:
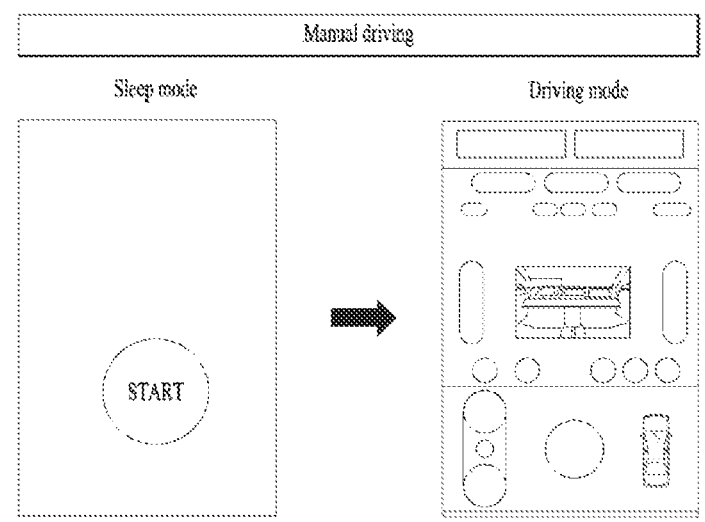
FIGS. 9 to 12 are examples of modes in which a console display is provided by a passenger in response to a driving state of a vehicle and display screens of the console display for the corresponding modes according to an embodiment of the present disclosure.

FIG. 9 is a diagram for explaining a display screen of the console display when the vehicle is in a manual driving state according to an embodiment of the present disclosure.

The vehicle may be a vehicle having a level of 4 or more, which is capable of performing manual driving and autonomous driving. In the present disclosure, the vehicle running on a road may perform manual driving or autonomous driving.

According to an embodiment of the present disclosure, the autonomous vehicle may provide various user interfaces (UIs) to passengers according to a detachment or attachment state of the console.

As shown in FIG. 9, the vehicle in a manual driving state may provide a driver-friendly user interface (UI). Alternatively, according to the embodiments of the present disclosure, the vehicle may display driver-friendly function(s) on a display only during manual driving thereof.

When the driver rides in the vehicle, a sleep mode may be provided on the console display.

According to one embodiment of the present disclosure, in the sleep mode, a 'START' button may be disposed in a partial region of the console display. When the 'START' button is selected by a user, starting of the vehicle may be turned on.

When the vehicle is in a manual driving state, information about such a driving mode may be provided on the console display.

According to one embodiment of the present disclosure, when the 'START' button is input during a sleep mode, the sleep mode may be released and the console display may switch to the driving mode. In another embodiment of the present disclosure, when the user depresses a brake of the vehicle, the sleep mode may be released and the console display may switch to the driving mode.

When the vehicle is in the driving mode, internal components of the console display may be arranged appropriately for the driving mode and/or user interfaces (UIs) appropriate for the driving mode may be displayed.

For example, the driving mode may include a first region, a second region, and a third region. The first region may include widgets 1 and 2 in which at least one function of the operation system is displayed as information displayed on the console display. The second region may display a function for controlling the air-conditioning device of the vehicle. The third region may display a function for controlling a gear device of the vehicle. Although the information displayed on the console display is divided into three regions as shown in FIG. 9, the scope or spirit of the present disclosure is not limited thereto, and such information can also be divided into other numbers of regions so as to provide information necessary for driving the vehicle.

In the driving mode, the console display may operate as an operation system to provide a UI so that vehicle setting information (e.g., gear, air conditioning, door opening, etc.) can be manipulated.

Referring to FIG. 9, the driving mode may display a stress care button (STRESS CARE), an inattention care button (INATTENTION CARE), an antibacterial air-conditioning button, a globe box lock/unlock button, an air-conditioner, an air-conditioning ON button (AUTO), an air-conditioning OFF button (OFF), a SYNC button, an air-volume button, a driver's seat temperature button, a passenger's seat temperature button, a general driving button, an autonomous driving button, a front-surface moisture removal button, a rear-surface moisture removal button, an inside/outside-air operation button, and the like.

In the driving mode, an image of gears and an image of the vehicle may be displayed in the third region. For example, the gear image may include a drive gear (D), a reverse gear (R), and a parking gear (P), and the vehicle image may display a door open state as an image.

When the gear is shifted according to user input, such gear shifting may be performed only when the speed of the vehicle is 0 km/h. In this case, for the user input for such gear shifting, a user interface (UI) based on movement of two fingers can be used.

Figure 10:
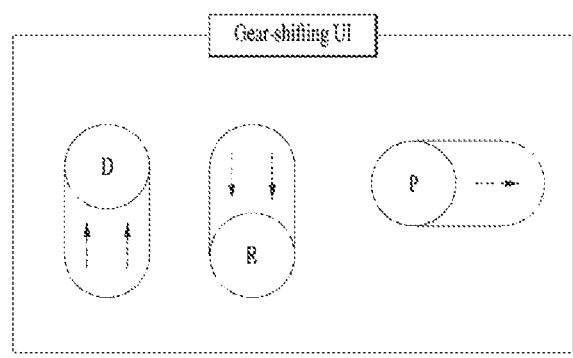

Referring to FIG. 10, in the driving mode, a gear shifting state varying depending on a user's two-finger input can be provided to a driver who rides in the vehicle.

For example, when upward dragging is performed by a user input, the gear may be shifted to the drive gear (D). For example, when downward dragging is performed by a user input, the gear may be shifted to the reverse gear (R). For example, when left-to-right dragging is performed by a user input, the gear may be shifted to the parking gear (P).

Figure 11:
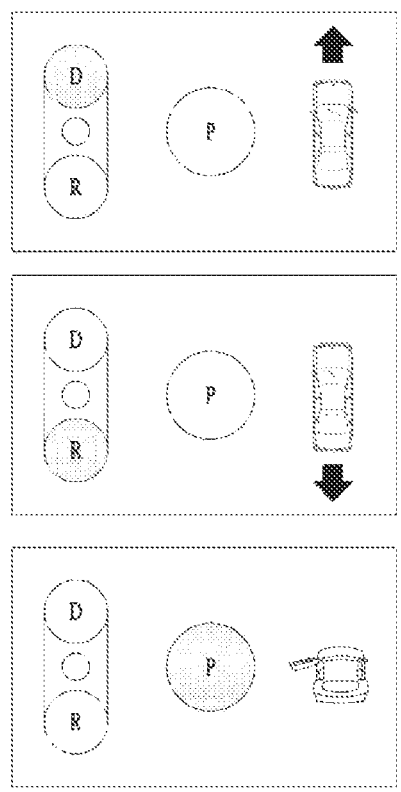

Referring to FIG. 11, when the gear is shifted to the drive gear (D), an image corresponding to forward driving of the vehicle may be displayed together with an image of the vehicle.

When the gear is shifted to the reverse gear (R), an image corresponding to backward driving of the vehicle may be displayed together with an image of the vehicle.

When the gear is at the parking gear (P), an image corresponding to opening of the vehicle door may be displayed on the console display.

In a situation where the vehicle is in the parking gear (P), when the door of the vehicle is opened, the vehicle can be controlled not to perform gear shifting to the drive gear (D) or the reverse gear (R).

Figure 12:
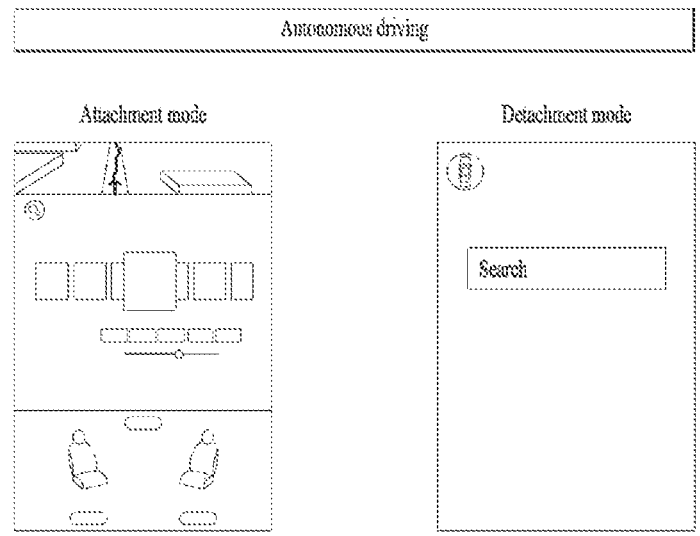

FIG. 12 is a diagram illustrating a screen image of the console display for the vehicle operating in an autonomous driving state according to an embodiment of the present disclosure.

When the vehicle is driving autonomously, the console display may provide an operation system or a display system using a user interface.

When the console display is attached to the holder, internal components of the console display may be arranged appropriately for the attachment mode and/or user interfaces (UIs) appropriate for the attachment mode may be displayed on the console display.

The attachment mode may include a first region, a second region, and a third region. The first region may display a navigation function as information displayed on the console display. The second region may display media display and manipulation screens. The third region may display seat control buttons.

Although the information displayed on the console display is divided into the first, second, and third regions as shown in FIG. 12, the scope or spirit of the present disclosure is not limited thereto, and such information can also be divided into various numbers of regions so as to provide information necessary for driving the vehicle.

The first region may display not only the navigation, but also clusters (speedometer, vehicle conditions, route guidance, etc.) and vehicle setting menus, etc. on the console display.

If the user presses a reclining button for the driver seat while viewing the attachment mode on the third region, the driver seat and the passenger seat may be tilted backward.

On the other hand, when the console display is detached from the holder, the console display may arrange internal components to be appropriate for the detachment mode, and/or user interfaces (UIs) appropriate for the detachment mode may be displayed on the console display.

The console display may provide an operation system or a display system as a UI in response to the detachment mode. For example, in response to the detachment mode, the same UI as the driving mode or the same UI as the attachment mode may be provided on the console display.

The detachment mode may serve as information displayed on the console display, and may display operation buttons necessary for the vehicle and search buttons for web surfing.

In addition, the detachment mode may provide a screen enabling office work function applications.

In association with applications displayed in the detachment mode, necessary applications may be downloaded through a market by the user, and the downloaded applications may be displayed.

Figure 13:
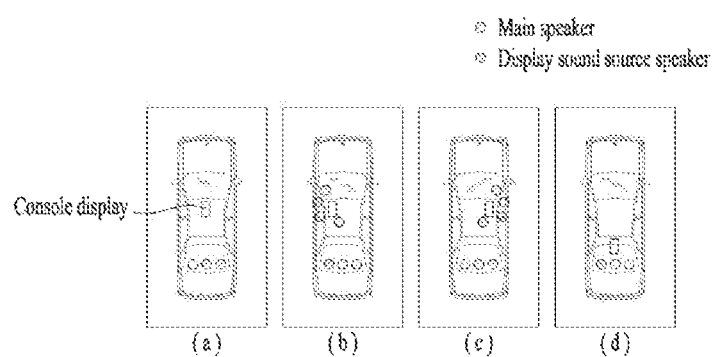
FIG. 13 is a diagram for explaining operations of devices located inside a vehicle according to a position of a console display according to an embodiment of the present disclosure.

FIG. 13 is a diagram for explaining operations of devices located inside the vehicle according to a position of the console display according to an embodiment of the present disclosure.

Referring to FIG. 13, the console display may be connected to a device inside the vehicle according to the position where the console display is in the vehicle.

The console display may be attached to the holder within the vehicle, so that the console display may operate as the display system or the operation system. In addition, when the console display is detached from the holder and is located at the driver seat, the passenger seat, or the rear seat of the vehicle, the console display may also be used as a single device.

When the console display is used as a single device, the console display may also display a large screen image by interacting with a personal device of the user and may provide a user interface (UI) corresponding to web browsing or media playback, but the scope of the present disclosure is not limited thereto.

As shown in FIG. 13(a), when the console display is attached to the display console, media and function execution sounds can be output from a main speaker and all speakers located in the vehicle. In this case, the main speaker may output all sound sources (i.e., the driving states of the vehicle, warnings, navigation, etc.) activated in the existing vehicle.

On the other hand, as shown in FIGS. 13(b) and 13(d), when the console display is detached and placed inside the vehicle, media and function execution sound sources may be output from nearby speakers and head speakers in response to the arrangement location of the console display.

As shown in FIG. 13(b), when the console display is disposed at the driver seat of the vehicle, execution sounds of media and functions operating in the console display may be output only from speakers near the driver seat and the head speaker.

As shown in FIG. 13(c), when the console display is disposed at the passenger seat of the vehicle, execution sounds of media and functions operating in the console display may be output only from speakers near the passenger seat and the head speaker.

As shown in FIG. 13(d), when the console display is disposed at the rear seat of the vehicle, execution sounds of media and functions operating in the console display may be output only from the rear-seat speaker.

Figure 14:
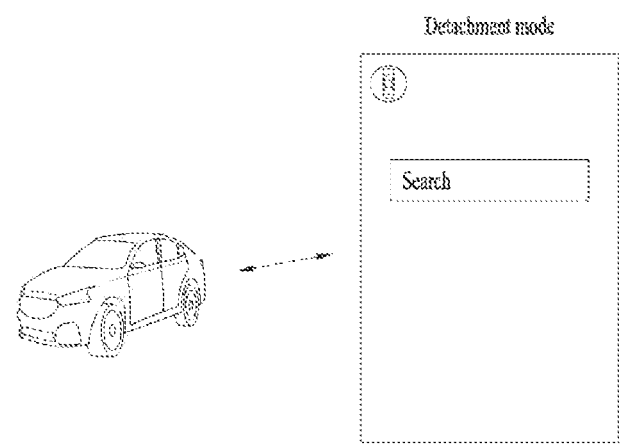
FIG. 14 is a diagram for explaining operations when a console display is located outside a vehicle according to an embodiment of the present disclosure.

FIG. 14 is a diagram illustrating operations performed when the console display is located outside the vehicle according to an embodiment of the present disclosure.

Referring to FIG. 14, when the console display is in the detachment mode, the console display may be connected to the vehicle in response to the exterior position of the vehicle.

When the vehicle is in a manual driving mode, the console display should be used as an operation system, so that the console display must be located inside the vehicle.

Accordingly, in order to prevent the occupants (including the driver and the passenger) from carrying the console display to the outside of the vehicle, the console display and the vehicle may output a warning.

The vehicle may determine whether the console display is in the detachment state, may determine whether the door of the vehicle is opened, and may determine whether ignition of the vehicle is ON, so that it is determined whether or not the occupant leaves the vehicle based on the results of such determination.

The vehicle may calculate the distance to the console display based on the intensity of connection strength between the console display and the vehicle. If the intensity of connection strength between the vehicle and the console display is equal to or less than a preset value, this means that the console display has moved away from the vehicle. If it is determined that the console display has moved away from the vehicle, the vehicle may output a warning sound through an external speaker.

On the other hand, when the console display moves away from the vehicle by a predetermined distance or more, the console display may receive a warning signal from the vehicle and may output a user interface (UI) corresponding to the warning signal.

Figure 15:
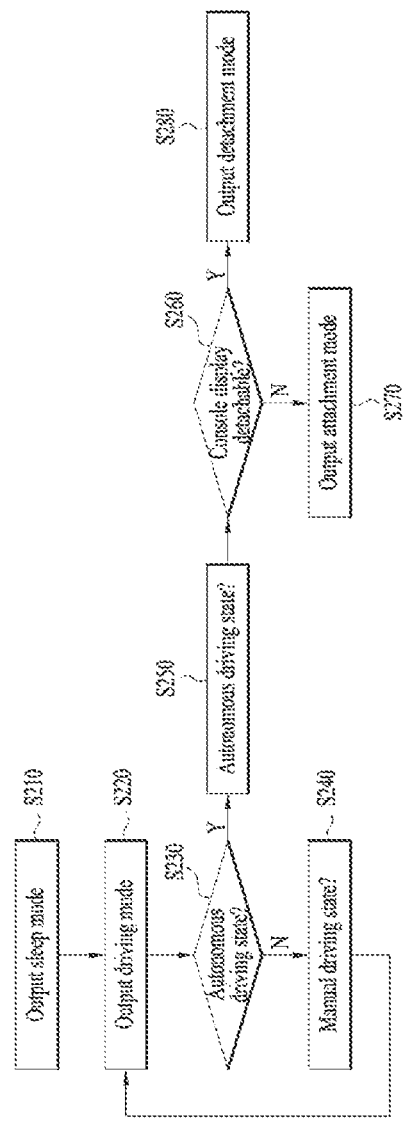
FIG. 15 is a flowchart illustrating a method for controlling a console display according to an embodiment of the present disclosure.

FIG. 15 is a flowchart illustrating a method for controlling the console display according to an embodiment of the present disclosure.

Referring to FIG. 15, a method for controlling the console display disposed in the vehicle may include determining a driving state of the vehicle; determining whether the console display is in a detachment or attachment state; and controlling an output mode displayed on the console display based on the driving state information of the vehicle and the attachment/detachment state of the console display. In this case, the driving state information of the vehicle may include driving state information of at least one of the driver's riding (or boarding) state, a manual driving state, and an autonomous driving state.

When the driver rides in the vehicle, the console display may output a UI corresponding to the sleep mode. The console display may output a START button for starting ignition of the vehicle in response to the sleep mode. In this case, the console display may be disposed in the holder, so that the console display is in the attachment state (S210).

After step S210, when the vehicle is in a manual driving state and the console display is in the attachment state, the console display may output an image of the driving mode. In addition, when the START button is selected by the user who handles the console display or when the brake of the vehicle is depressed, the console display may switch from the sleep mode to the driving mode so that it can output a user interface (UI) corresponding to the driving mode (S220).

After step S220, the driving state of the vehicle may be determined (S230). When the vehicle is in the manual driving state and the console display is in the attachment state, the console display may output an image of the driving mode. The console display may output a user interface (UI) (S240). In step S240, the UI displayed on the console display may include a widget for displaying at least one function of the operation system of the vehicle in response to the driving mode, a function for controlling the air-conditioner, and a function for controlling a gear device.

After step S230, when the vehicle is in the autonomous driving state (S250), the vehicle may determine whether the console display is in the detachment or attachment state (S260).

After step S260, when the vehicle is in the autonomous driving state and the console display is in the attachment state, the console display may output an image of the attachment mode. The console display may output a user interface (UI) (S270). In step S270, the UI displayed on the console display may include a navigation function of the vehicle, a function for controlling media display and screen manipulation, and a function for controlling a seat device in response to the attachment mode.

After step S260, when the vehicle is in the autonomous driving state and the console display is in the detachment state, the console display may output an image of the attachment mode.

The console display may output a user interface (UI) (S280). In step S280, the UI displayed on the console display may include a function for displaying a screen image by interacting with a personal device of the user, a web-browsing function, and a media playback function.

In another aspect of the present disclosure, the above-described proposal or operation of the present disclosure may be provided as codes that may be implemented, embodied or executed by a "computer" (System on Chip (SoC)), an application storing or containing the codes, a computer-readable storage medium, a computer program product, and the like, which also comes within the scope of the present disclosure.

A detailed description of preferred embodiments of the present disclosure disclosed as described above is provided so that those skilled in the art can implement and embody the present disclosure. Although the description is made with reference to the preferred embodiments of the present disclosure, it will be appreciated by those skilled in the art that various modifications and variations can be made in the present disclosure without departing from the spirit or scope of the disclosures. For example, those skilled in the art may use the respective components described in the above-described embodiments in a manner of combining them with each other.

Accordingly, the present disclosure is not intended to be limited to the embodiments shown herein, but to be given the broadest scope that matches the principles and novel features disclosed herein.

As is apparent from the above description, the vehicle system according to any one of the embodiments of the present disclosure can improve the operability of the display through interaction between the console display and the vehicle, thereby increasing marketability of the vehicle.

The vehicle system according to the embodiments of the present disclosure can provide functions and notifications required for the user through a display of the operating system output from the console display.

The operating system output from the console display according to the embodiments of the present disclosure can provide the user with a differential display UI (user interface).

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A system for operating a display console to display one of a plurality of user interaction screens depending on a location of the display console, the display console being movable by a user to be located inside or outside a vehicle, the vehicle including a plurality of user interface devices, the system comprising:
    a processor; and
    a non-transitory computer-readable medium storing executable instructions which, when executed by the processor, cause the processor to control the system to perform:
        determining a location of the display console;
        determining whether the determined location of the display console corresponds to a predetermined location;
        in response to the determined location of the display console not corresponding to the predetermined location, controlling the display console to display a first user interaction screen corresponding to the determined location of the display console, the first user interaction screen configured to allow the user to control a first set of functions of the vehicle; and
        in response to the determined location of the display console corresponding to the predetermined location, performing:
            identifying one of the plurality of user interface devices as a linked device to which the display console is operationally linked; and
            controlling the display console to display a second user interaction screen corresponding to the linked device, the second user interaction screen configured to allow a user to control a second set of functions of the vehicle operationally linked to the linked device.

2. The system of claim 1, wherein, for determining the location of the display console, the instructions, when executed by the processor, further cause the processor to control the system to perform:
    determining whether the display console is located inside or outside the vehicle; and
    in response to determining that the display console is located inside the vehicle, determining whether the display console is located at a front seat or back seat of the vehicle.

3. The system of claim 2, wherein the predetermined location includes a location at the front seat of the vehicle.

4. The system of claim 3, wherein, when the display console is determined to be located outside the vehicle, the first set of functions of the vehicle includes at least one of locking, vehicle location, lighting, air-conditioning and parking functions of the vehicle.

5. The system of claim 3, wherein, when the display console is determined to be located at the back seat of the vehicle, the first set of functions of the vehicle includes at least one of passenger air-conditioning, media and passenger seat adjustment functions of the vehicle.

6. The system of claim 3, wherein the plurality of user interface devices includes a front display and steering wheel of the vehicle.

7. The system of claim 6, wherein, when that the display console is determined to be operationally linked to the front display of the vehicle, the second set of the functions of the vehicle includes at least one of media, navigation, phone, temperature setting and air-conditioning functions of the vehicle.

8. The system of claim 6, wherein, for determining the location of the display console, the instructions, when executed by the processor, further cause the processor to control the system to perform determining whether the display console is located in front or back of the steering wheel of the vehicle.

9. The system of claim 8, wherein, when the display console is determined to be located in back of the steering wheel, the second set of the functions of the vehicle includes at least one of speed, tripmeter, drive assistance and vehicle setting functions of the vehicle.

10. The system of claim 8, wherein, when the display console is determined to be located in front of the steering wheel, the second set of the functions of the vehicle includes at least one of volume, media and driver assistance functions of the vehicle.

11. A method of operating a display console to display one of a plurality of user interaction screens depending on a location of the display console, the display console being movable by a user to be located inside or outside a vehicle, the vehicle including a plurality of user interface devices, the method comprising:
    determining a location of the display console;

determining whether the determined location of the display console corresponds to a predetermined location;

in response to the determined location of the display console not corresponding to the predetermined location, controlling the display console to display a first user interaction screen corresponding to the determined location of the display console, the first user interaction screen configured to allow the user to control a first set of functions of the vehicle; and in response to the determined location of the display console corresponding to the predetermined location, performing:

identifying one of the plurality of user interface devices as a linked device to which the display console is operationally linked; and controlling the display console to display a second user interaction screen corresponding to the linked device, the second user interaction screen configured to allow a user to control a second set of functions of the vehicle operationally linked to the linked device.

12. The method of claim 11, wherein determining the location of the display console comprises:

determining whether the display console is located inside or outside the vehicle; and in response to determining that the display console is located inside the vehicle, determining whether the display console is located at a front seat or back seat of the vehicle.

13. The method of claim 12, wherein the predetermined location includes a location at the front seat of the vehicle.

14. The method of claim 13, wherein, when the display console is determined to be located outside the vehicle, the first set of functions of the vehicle includes at least one of locking, vehicle location, lighting, air-conditioning and parking functions of the vehicle.

15. The method of claim 13, wherein, when the display console is determined to be located at the back seat of the vehicle, the first set of functions of the vehicle includes at least one of passenger air-conditioning, media and passenger seat adjustment functions of the vehicle.

16. The method of claim 13, wherein the plurality of user interface devices includes a front display and steering wheel of the vehicle.

17. The method of claim 16, wherein, when that the display console is determined to be operationally linked to the front display of the vehicle, the second set of the functions of the vehicle includes at least one of media, navigation, phone, temperature setting and air-conditioning functions of the vehicle.

18. The method of claim 16, wherein determining the location of the display console further comprises determining whether the display console is located in front or back of the steering wheel of the vehicle.

19. The method of claim 18, wherein, when the display console is determined to be located in back of the steering wheel, the second set of the functions of the vehicle includes at least one of speed, tripmeter, drive assistance and vehicle setting functions of the vehicle.

20. The method of claim 18, wherein, when the display console is determined to be located in front of the steering wheel, the second set of the functions of the vehicle includes at least one of volume, media and driver assistance functions of the vehicle.

* * * * *